United States Patent [19]

Inaba et al.

[11] Patent Number: 4,492,301
[45] Date of Patent: Jan. 8, 1985

[54] WORKPIECE FEEDER

[75] Inventors: Hajimu Inaba, Hino; Nobutoshi Torii, Hachioji, both of Japan

[73] Assignee: Fujitsu Fanuc Limited, Tokyo, Japan

[21] Appl. No.: 390,560

[22] Filed: Jun. 21, 1982

[30] Foreign Application Priority Data

Jun. 30, 1981 [JP] Japan .................... 56-100501

[51] Int. Cl.$^3$ .................................... B65G 37/00
[52] U.S. Cl. .................... 198/472; 198/345; 198/648; 414/223; 414/417
[58] Field of Search .......... 198/339, 345, 656, 482, 198/484, 796, 341, 648, 472; 414/47, 223, 564, 609, 416, 417, 28, 45, 199, 100; 187/24, 25, 34, 36, 32; 318/265

[56] References Cited

U.S. PATENT DOCUMENTS

| | | | |
|---|---|---|---|
| Re. 10,191 | 8/1882 | Tewksbury | 187/32 |
| 374,396 | 12/1887 | Cannon | 187/32 |
| 1,989,039 | 1/1935 | Geyer | 198/345 X |
| 2,611,473 | 9/1952 | Reynolds | 198/648 |
| 3,267,530 | 8/1966 | Buttkereit et al. | 414/28 X |
| 3,710,711 | 1/1973 | Boehm et al. | 198/482 X |
| 4,049,500 | 9/1977 | Kamm | 198/345 |

FOREIGN PATENT DOCUMENTS

2101097  1/1983  United Kingdom ............ 414/118

*Primary Examiner*—Robert J. Spar
*Assistant Examiner*—Jonathan D. Holmes
*Attorney, Agent, or Firm*—Armstrong, Nikaido, Marmelstein & Kubovcik

[57] ABSTRACT

A workpiece feeder for successively feeding workpieces to a predetermined workpiece gripping station of the robot's hand. The workpiece feeder includes a conveyor having a plurality of interspaced pallets traveling on a table. Each pallet comprises a lower plate having a central opening and an upper plate which is detachably mounted on the lower plate. The workpiece feeder is provided with a lifting means having a vertically movable platform which ascends through the central opening in the lower plate to lift the upper plate away from the lower plate, thereby elevating the workpiece on the pallet up to the level of the gripping position of the robot's hand. The workpiece feeder further comprises a stop mechanism for limiting the topmost position of the platform. The workpiece feeder according to the invention is particularly suitable for use with an industrial robot of the simplified type in which the upright stand enabling the robot's hand to perform vertical translational movement is omitted.

3 Claims, 12 Drawing Figures

| Fig. 7 | |
|---|---|
| Fig. 7a | Fig. 7b |

WORKPIECE FEEDER

PLATFORM ASCENDS
↓
POSITIONING OF PLATFORM
↓
PLATFORM DESCENDS
↓
PLATFORM ASCENDS
↓
POSITIONING OF PLATFORM
↓
PLATFORM DESCENDS
↓
CONVEYOR IS ADVANCED BY ONE PITCH

Fig. 8

WORKPIECE FEEDER

BACKGROUND OF THE INVENTION (1) Field of the Invention

The present invention relates to a workpiece feeder and, more particularly, to an apparatus for feeding workpieces to a workpiece gripping position of a hand of an industrial robot.

(2) Description of the Prior Art

In fully automated factories, industrial robots are used for loading and unloading workpieces on and from lathes, milling machines, drilling machines, and other machine tools. Industrial robots are served by workpiece feeders which feed workpieces one by one to workpiece gripping position of the industrial robot. A known workpiece feeder includes a frame, a table mounted on said frame, and an endless conveyor mounted on said table. The conveyor of the workpiece feeder comprises an endless linkbelt having at least one belt run portion extending over said table. A plurality of pallets interspaced from each other at equal distances are connected to the linkbelt in such a manner that they are moved along a predetermined path extending across a point located below the gripping station of the hand of the robot. The conveyor is driven intermittently so that each of the pallets is successively brought under the gripping station of the robot and is held in place for the time period required for the robot to grip the workpiece on the pallet and load it on a machine tool for machining thereof. After machining, the robot unloads the workpiece from the machine tool and places it back on the workpiece feeder or transfers it to another workpiece feeder serving another robot associated with another machine tool.

In its normal form, an industrial robot has a base on which an upright stand is swiveled for rotation about a vertical axis. The upright stand comprises a lead screw and a pair of opposite parallel guide shafts on which a carriage is mounted for vertical translational movement. The carriage is provided with a horizontal telescoping arm, at the free end of which is mounted a robot hand by means of a wrist which enables the hand to rotate about a horizontal axis as well as to swing about a vertical axis. The horizontal telescoping movement of the arm in combination with the vertical translational movement of the carriage and swivelling motion of the upright stand enables the robot hand to move toward any desired three-dimensional point within the reach of the arm and to grip a workpiece placed on a pallet of the conveyor located at any three-dimensional position.

However, the above-mentioned three dimensional-type robots suffer from high production costs. Industrial robots simpler in construction, i.e., not having the upright stand, have therefore been developed and have come into wide use. Such simplified robots have telescoping arms mounted on arm holders which, in turn, are hinged to a bracket mounted rotatably on a base about a horizontal axis. Thus, the robot's hand is only capable of gripping workpieces positioned at a predetermined height. In order to ensure the robot hand correctly grips a workpiece, the workpiece must first be elevated to the height of the gripping position of the hand. As of now, there have been no workpiece feeders able to be used for such simplified industrial robots.

SUMMARY OF THE INVENTION

The object of the present invention is to provide a workpiece feeder capable of feeding workpieces to a predetermined workpiece gripping position of an industrial robot.

Another object of the present invention is to provide a workpiece feeder suitable for feeding workpieces placed one on each pallet of the conveyor.

The present invention provides a workpiece feeder for successively feeding workpieces to a predetermined area, typically a workpiece gripping station of a hand of an industrial robot, said workpiece feeder including a frame, a table mounted on said frame, and an endless conveyor mounted on said table and having a plurality of movable pallets interspaced from each other at equal distances, said conveyor having at least one belt run portion extending over said table and adapted to move said pallets intermittently one by one under said predetermined area; characterized in that said table has a window aligned with said predetermined area, that each of said pallets comprises a lower plate having a central opening and an upper plate which is detachably mounted on said lower plate, that there is provided a lifting means having a platform movable vertically through said window in the table and said central opening in the lower plate to engage said upper plate from below, causing said upper plate to move and to lift a workpiece placed on said upper plate up to said workpiece gripping position of the robot, and that there is provided a stop mechanism engageable with said platform for limiting the upward movement thereof so that when said platform is lifted together with a workpiece placed thereon, said platform abuts against said stop mechanism, thereby holding the workpiece at said predetermined area.

The stop mechanism may comprise a vertically extending pillar mounted on the table or frame and a stop member connected at a right angle to the top of the pillar.

Preferably, the stop mechanism may be provided with an adjusting mechanism for adjusting the vertical position of the stop member. The adjusting mechanism may comprise a rack mounted lengthwise on the pillar and an associating pinion which is rotatably mounted on the machine frame and is in mesh with said rack. Alternatively, the adjusting mechanism may comprise a rack mounted on the pillar and an associating toothed plate which is releasably mounted on a channel slidingly receiving the pillar.

The pillar of the stop mechanism may be provided with a scale in order to facilitate visual determination of the position of the stop member.

BRIEF DESCRIPTION OF THE DRAWINGS

FIG. 3b is a cross-sectional view taken along the line X—X of FIG. 3a;

FIG. 4b is a cross-sectional view taken along the line Y—Y of FIG. 4a;

FIG. 7, including

DESCRIPTION OF THE PREFERRED EMBODIMENT

Figure 1:
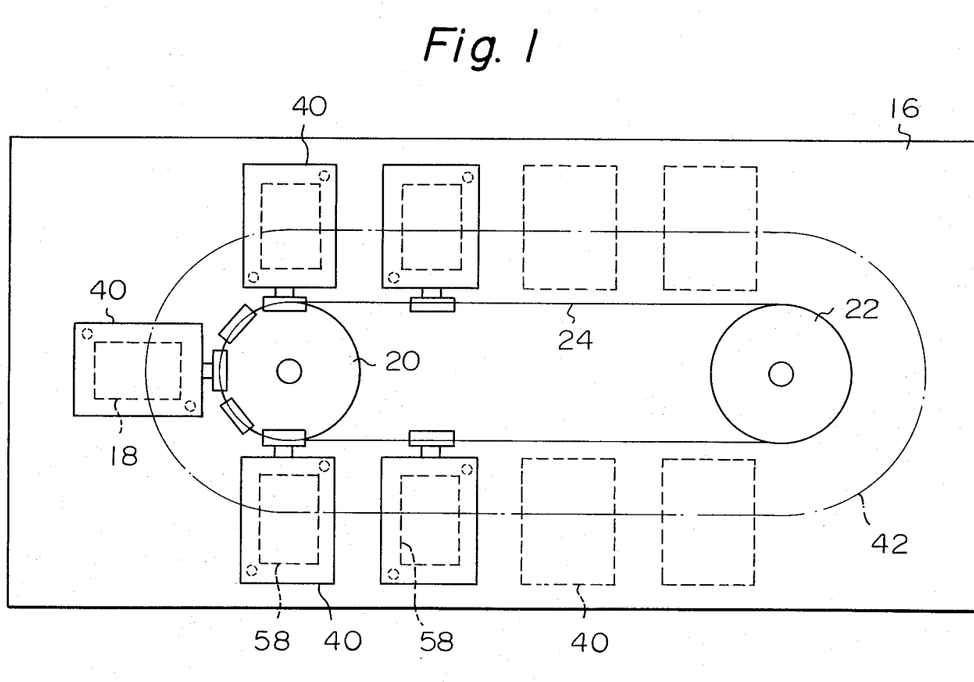
FIG. 1 is a schematic top plan view of the workpiece feeder according to the invention.
Figure 2:
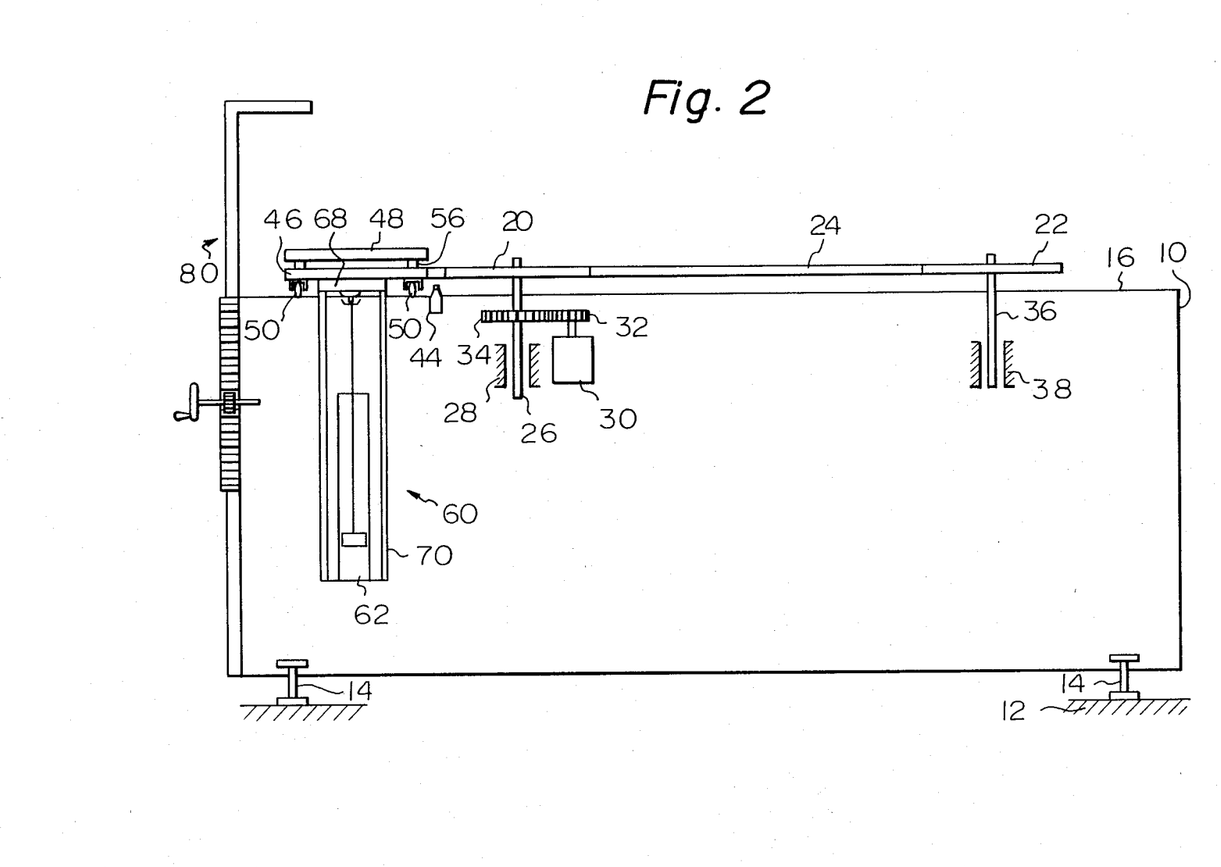
FIG. 2 is a schematic front elevational view of the workpiece feeder of FIG. 1.

Referring now to the drawings, FIGS. 1 and 2 schematically illustrate an embodiment of the workpiece feeder according to the present invention. A frame 10 is rigidly supported on the floor 12 by means of stud bolts 14. The frame 10 is provided at its top with a table 16 which has a window 18 for accommodating a lifting means, described later.

The table 16 is provided with a conveyor which comprises a pair of spaced sprocket wheels 20 and 22 and a linkbelt 24 passed thereover. The driving sprocket wheel 20 is mounted on a shaft 26 which is journalled on a bearing 28 and is driven by an electric motor 30 through a pair of gears 32 and 34. The idle sprocket wheel 22 is mounted on a shaft 36 which is journalled on a bearing 38 for free rotation. A plurality of equally spaced pallets 40 are connected to the linkbelt 24 such that they are moved along a path 42 extending across the window 18. A limit switch 44 is provided on the table 16 and is adapted to engage with each pallet 40 to control the electric motor 30 in such a manner that each pallet 40 is intermittently driven and is successively brought in alignment with the window 18.

Figure 3A:
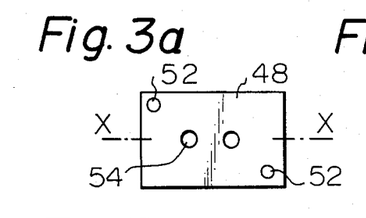
FIG. 3a is a bottom view of the upper plate of the pallet of the conveyor.
Figure 3B:
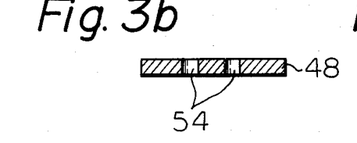
Figure 4A:
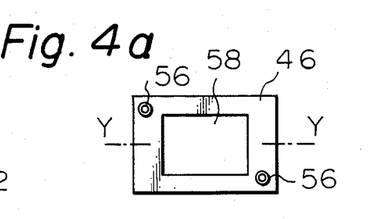
FIG. 4a is a top plan view of the lower plate of the pallet.
Figure 4B:
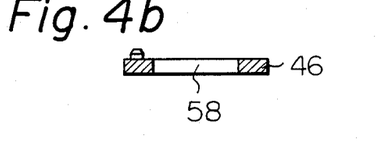

Each pallet 40 of the conveyor comprises a lower plate 46 and an upper plate 48. It is the lower plate 46 that is linked to the linkbelt 24, while the upper plate 48 is disconnected to the linkbelt 24 and is merely detachably mounted on the lower plate 46. Each lower plate 46 is provided on the lower surface thereof with four rollers 50 to ensure each pallet 40 travels smoothly on the table surface. As shown in FIGS. 3a and 3b, the upper plate 48 has a pair of diagonally opposite recesses 52 and a pair of apertures 54. As shown in FIGS. 4a and 4b, the lower plate 46 is provided with a pair of projections 56 mating with the recesses 52 in the upper plate 48, so that when the upper plate 48 is superposed on the lower plate 46, the projections 56 engage with the recesses 52, to detachably support the upper plate 48 as well as to correctly position the upper plate 48 with respect to the lower plate 46. The lower plate 46 is also provided with a central opening 58 which has a size slightly larger than that of the window 18.

Figure 5:
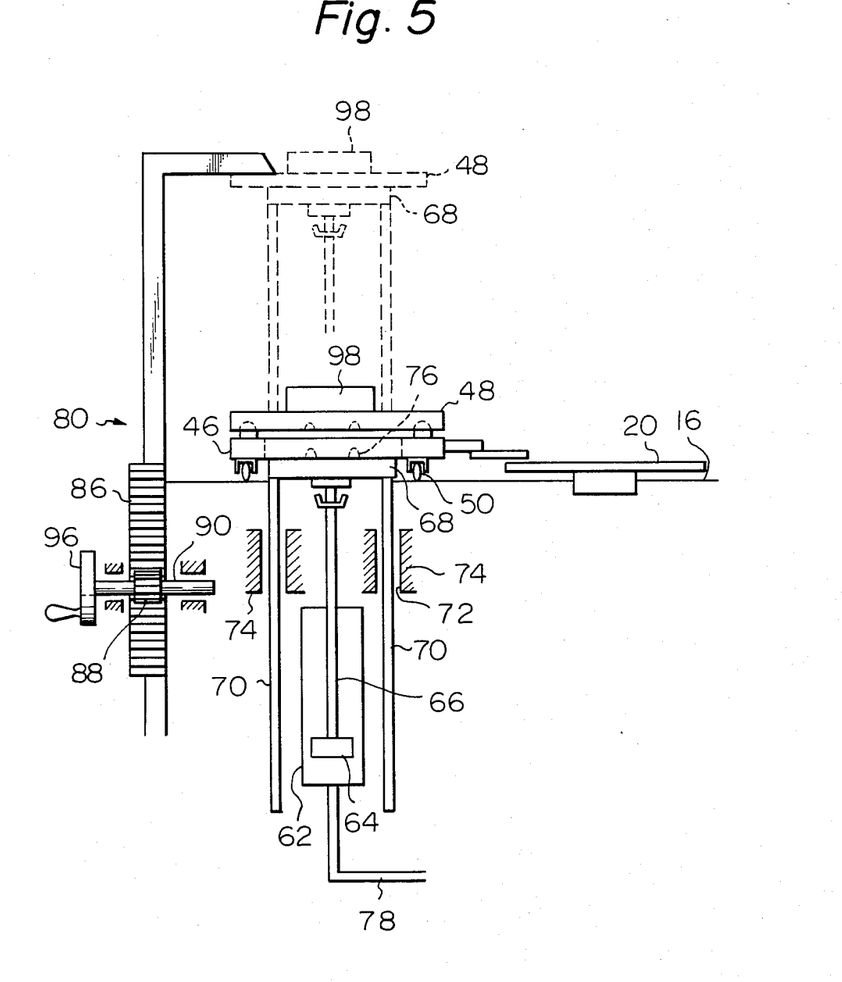
FIG. 5 is an enlarged front elevational view illustrating the detail of the lifting means.

The workpiece feeder is provided with a lifting means, indicated by the general reference numeral 60, at the window 18 of the table 16. As shown in more detail in FIG. 5, the lifting means 60 has a pneumatic cylinder 62 in which is closely fitted a piston 64 mounted at an end of a connecting rod 66, the other end of which is connected to a movable platform 68. A pair of parallel guide rods 70 are rigidly connected to the platform 68 and slidably engage within bores 72 formed in guides 74 in order to guide the platform 68 during its vertical movement. The platform 68 is provided at its upper surface with a pair of projections 76 corresponding to the apertures 54 in the upper plate 48. The inlet of the air cylinder 62 is connected by a piping 78 to a suitable compressed air source, not shown.

Figure 6:
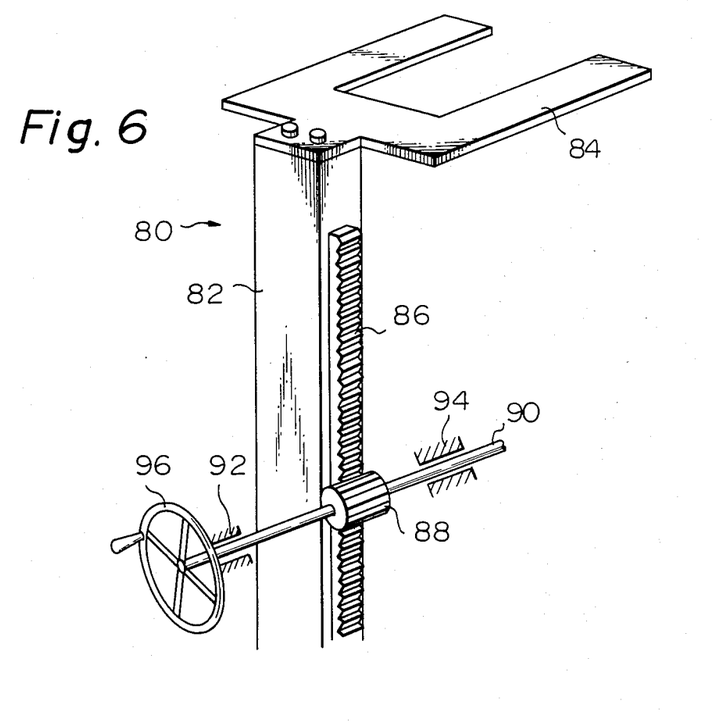
FIG. 6 is a perspective view of the stop mechanism with an adjusting mechanism.

A stop mechanism, shown by general reference numeral 80, is provided at a side of the table 16 in alignment with the window 18. As shown in FIG. 6, the stop mechanism 80 includes a pillar 82 slidably mounted to the frame 10 and a U-shaped stop 84 bolted to the top of the pillar 82. The pillar 82 is provided at a side thereof with a rack 86 engaging with a pinion 88 mounted on a shaft 90 which is journalled on bearings 92 and 94 and is adapted to be rotated by a handle 96. Thus, by rotating the handle 96 in one or an other direction, it is possible to raise or lower the pillar 82 to adjust the level of the stop 84.

The operation of the workpiece feeder according to the invention is as follow.

As one of pallets 40 is brought into alignment with the window 18, the limit switch 44 engages with the leading end of the next pallet and interrupts the feed of electric power to the motor 30. Then, compressed air is supplied to the air cylinder 62 to move the piston 64 upward, causing the platform to move upwardly through the central opening 58 in the lower plate 46 of the pallet 40 until it comes into contact with the bottom of upper plate 48. The platform 68, with its projections 76 engaged within the apertures 54 of the upper plate 48, then lifts the upper plate 48 away from the lower plate 46 and further propels the upper plate together with a workpiece 98 placed thereon until the upper plate abuts against the stop 84, as shown by a ghost line in FIG. 5. This elevated position of the workpiece 98 represents the workpiece gripping station of the robot, not shown. The robot hand grips the workpiece on the upper plate and hands it over to a machine tool, not shown, arranged at the other side of the robot.

The vertical position of the stop 84 may be adjusted by rotating the handle 96 so that the workpiece feeder can serve with a robot having a gripping station at different heights or to accommodate workpieces having different dimensions.

Figure 7A:
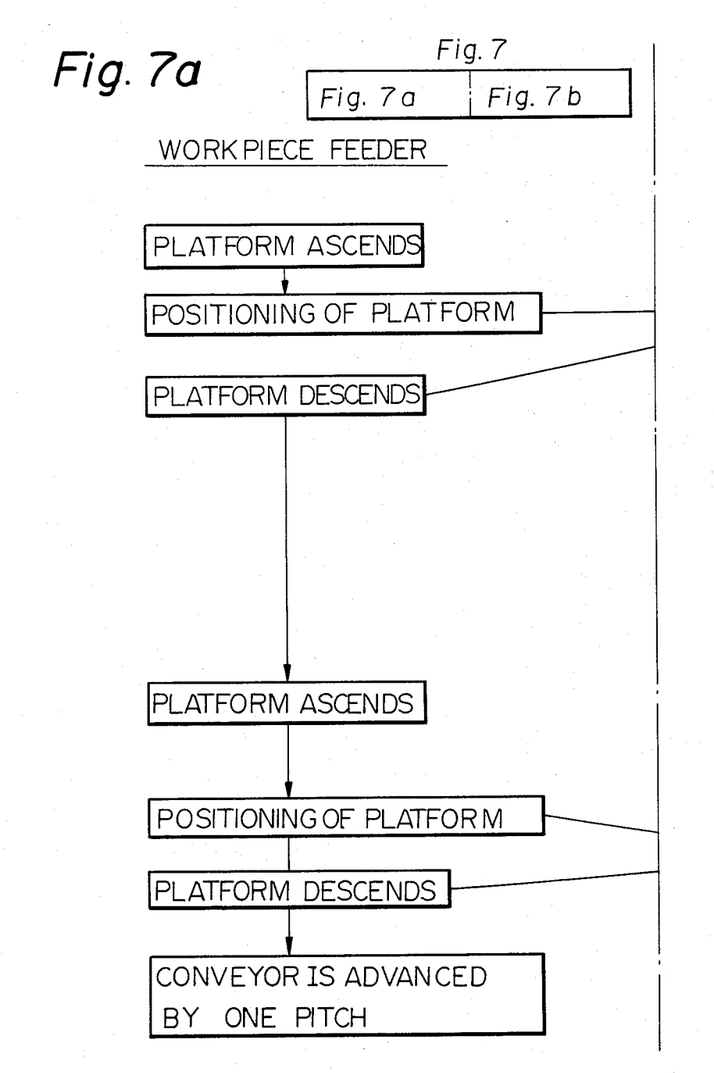
FIGS. 7a and 7b, is a flow-chart showing the sequence of motion of the workpiece feeder and the robot.
Figure 7B:
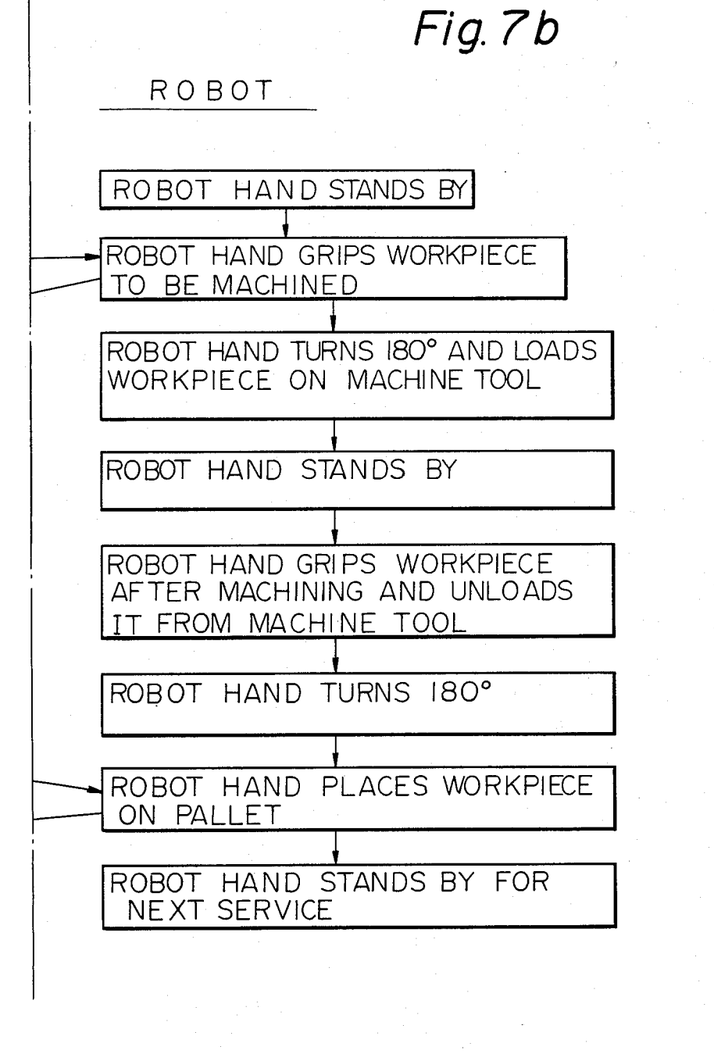

The motion of the workpiece feeder and robot hand may be performed in the sequence shown in the flow-chart of FIG. 7. At the outset, the robot's hand stands by at its workpiece gripping station. The platform ascends and is positioned by the stop at the gripping station. Then, the robot hand grips the workpiece and the wrist of robot's hand turns 180° to load the workpiece on the machine tool. The platform descends and stands by until machining of the workpiece is completed, whereupon it ascends again and is positioned by the stop at the workpiece gripping station to receive the workpiece from the robot hand after machining. The platform descends back to its rest position and the conveyor is advanced by one pitch to bring another workpiece carrying pallet under the gripping position of the robot. The robot hand stands by for the next service. The above-described sequence may be ensured by first incorporating the sequence of the workpiece feeder into the program stored in the control unit of the robot and by controlling the actuators and sensors provided on the workpiece feeder through said control unit. Alternatively, the workpiece feeder may be provided with a simple sequence controller that controls the feeder in response to signals issued from the control unit of the robot.

Figure 8:
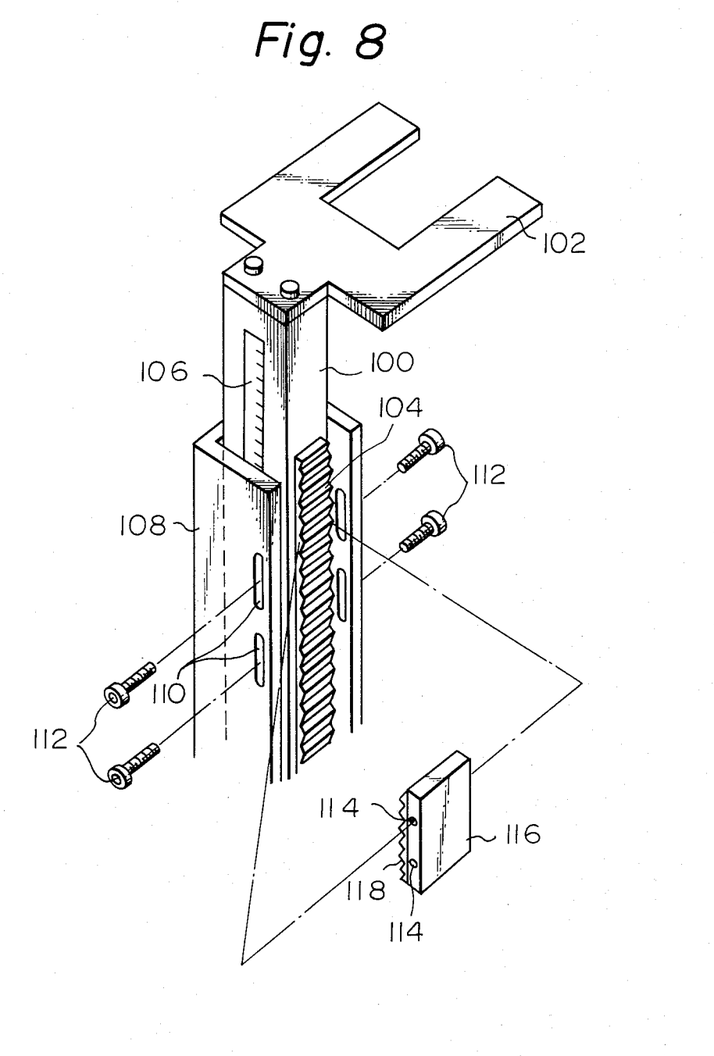
FIG. 8 is a perspective view of another form of adjusting mechanism.
Figure 9:
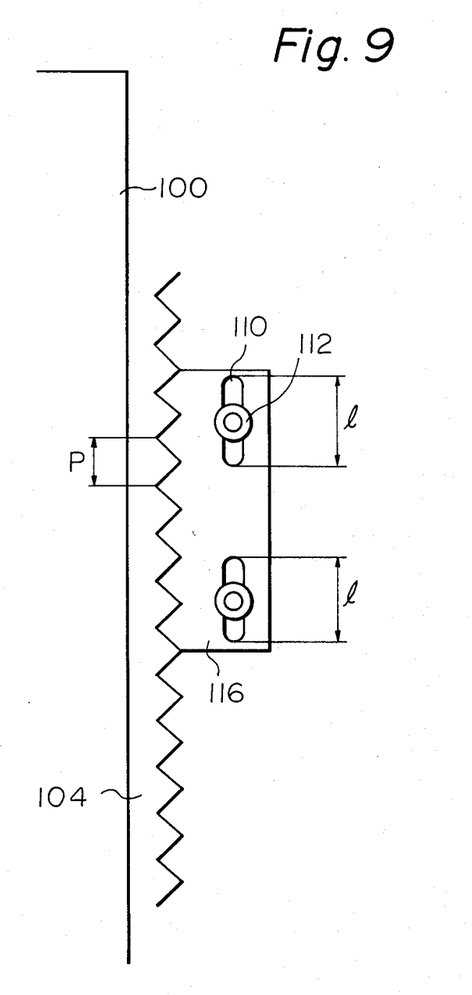
FIG. 9 is a partial side elevational view of the adjusting mechanism of FIG. 8.

FIGS. 8 and 9 illustrate another form of the stop mechanism shown in FIG. 6. The pillar 100 is provided at its top with a stop 102 and at a side thereof with a rack 104 similar to the example shown in FIG. 6, but in this example the pillar 100 has a scale 106 at the front face thereof. The pillar and rack assembly is slidably received within a channel 108 rigidly connected to the frame. The channel 108 is provided with slots 110 through which screws 112 are inserted. The screws 112 are screwed into threaded holes 114 provided in a toothed plate 116 having teeth 118 which are in mesh with the rack 104. As shown in FIG. 9, the length l of the slot 110 is larger than the pitch P of the teeth 118 of the plate 116, so that the screws 112 may be positioned at any vertical position within the range of the pitch P.

For adjustment of the height of the stop 102, the screws 112 are released and the pillar 100 is moved together with the toothed plate 116 through a desired distance by reading the scale and by sliding the screws along the slots. Then, the screws are fastened to lock the toothed plate at a new position. The toothed plate may be disengaged from the associating rack if the stop is to be displaced through a distance larger than the length of pitch P.

While the present invention has been described herein with reference to specific embodiments thereof, it is to be understood that considerable variations may be made without departing from the scope of the invention. For example, in the illustrated embodiment, the conveyor is described as comprising the whole of the belt run thereof extending over the table. However, the conveyor may be of the type which has a portion of the upper belt run passing over the table but its lower belt run disposed under the table.

We claim:

1. A workpiece feeder for successively feeding workpieces to a predetermined area, typically a workpiece gripping position of a hand of an industrial robot, said workpiece feeder including a frame, a table mounted on said frame, and an endless conveyor mounted on said table and having plurality of movable pallets interspaced from each other at equal distances, said conveyor having at least one belt run portion extending over said table and adapted to move said pallets intermittently one by one under said predetermined area; characterized in that said table has a window aligned with said predetermined area, that each of said pallets comprises a lower plate having a central opening and an upper plate which is detachably mounted on said lower plate, that there is provided a lifting means having a platform movable vertically through said window in the table and said central opening in the lower plate to engage said upper plate from below, causing said upper plate to move and lift a workpiece placed on said upper plate up to said workpiece gripping position of the robot, and that there is provided a stop mechanism engageable with said platform for limiting the upward movement thereof so that when said platform is lifted together with a workpiece placed thereon, said platform abuts against said stop mechanism thereby holding the workpiece at said predetermined area, said stop mechanism including a vertically extending pillar mounted to the frame, a stop member connected to the top of the pillar and extending horizontally toward the workpiece gripping position, and means for adjusting the vertical position of said stop member, said adjusting means including a rack mounted lengthwise of the pillar and an associated pinion which is rotatably mounted on the machine frame and is in mesh with said rack.

2. A workpiece feeder for successively feeding workpieces to a predetermined area, typically a workpiece gripping position of a hand of an industrial robot, said workpiece feeder including a frame, a table mounted on said frame, and an endless conveyor mounted on said table and having a plurality of moveable pallet interspaces from each other at equal distances, said conveyor having at least one belt run portion extending over said table and adapted to move said pallets intermittently one by one under said predetermined area; characterized in that said table has a window aligned with said predetermined area, that each of said pallets comprises a lower plate having a central opening and an upper plate which is detachably mounted on said lower plate, that there is provided a lifting means having a platform movable vertically through said window in the table and said central opening in the lower plate to engage said upper plate from below, causing said upper plate to move and lift a workpiece placed on said upper plate up to said workpiece gripping position of the robot, and that there is provided a stop mechanism engageable with said platform for limiting the upward movement thereof so that when said platform is lifted together with a workpiece placed thereon, said platform abuts against said stop mechanism thereby holding the workpiece at said predetermined area, said stop mechanism including a vertically extending pillar mounted to the frame, a stop member connected to the top of the pillar and extending horizontally toward the workpiece gripping position, and means for adjusting the vertical position of said stop member, said adjusting means including a rack mounted on said pillar and an associated toothed plate which is releasably mounted on a channel slidingly receiving the pillar.

3. A workpiece feeder according to claim 1 or 2, wherein said pillar is provided with a scale.

* * * * *